United States Patent [19]

Maldonado et al.

[11] 4,154,710

[45] May 15, 1979

[54] METHOD OF PREPARING NOVEL BITUMEN COMPOSITIONS

[75] Inventors: Paul Maldonado, Saint-Symphorien-d'Ozon; Robert Leger, Grigny, both of France

[73] Assignee: Elf Union, Paris, France

[21] Appl. No.: 833,515

[22] Filed: Sep. 15, 1977

[30] Foreign Application Priority Data

Sep. 17, 1976 [FR] France ............................... 76 27937

[51] Int. Cl.$^2$ ............................................. C08L 95/00
[52] U.S. Cl. ........................ 260/28.5 AS; 260/23 AR; 260/23 XA; 260/23 H; 260/23.7 R; 260/23.7 M; 260/23.7 C; 260/28.5 A; 260/28.5 B; 260/28.5 D; 260/28.5 R

[58] Field of Search ................... 260/28.5 AS, 28.5 A, 260/28.5 B, 28.5 D, 28.5 R, 23 AR, 23 XA, 23 H, 23.7 R, 23.7 M, 23.7 C

[56] References Cited

U.S. PATENT DOCUMENTS

| | | | |
|---|---|---|---|
| 3,547,850 | 12/1970 | Montgomery | 260/28.5 AS |
| 3,644,240 | 2/1972 | Tarbell et al. | 260/28.5 AS |

*Primary Examiner*—Melvyn I. Marquis
*Attorney, Agent, or Firm*—Burgess, Ryan and Wayne

[57] ABSTRACT

A method of preparing novel bitumen compositions which comprises a first step wherein an olefinic unsaturated organic compound having a molecular weight varying between 300 and 30,000 is added to a bitumen having a penetration value varying between 30 and 220, and a second step wherein a polymer having a molecular weight varying between 100,000 and 2,000,000 is added to the product obtained from said first step.

10 Claims, No Drawings

METHOD OF PREPARING NOVEL BITUMEN COMPOSITIONS

The present invention is directed to novel compositions containing bitumen and polymers having a high molecular weight.

Bitumens must exhibit certain specific mechanical properties to be useful in various applications especially when said bitumens are used as binders for coatings or for roads. These properties are defined by various tests among which the following tests may be cited:

the softening point (Ring and Ball test) according to the French standard NF T 66 008);

the breaking or Fraass point according to standard IP 80/53;

the adhesive power, said adhesive power being measured by determining the adhesiveness of bitumen in the presence of water, according to the method defined by the French Laboratoire Central des Ponts et Chaussées called "Test for determining the behaviour of a binder in the presence of water, bitumens, fluidified bitumens, fluxed bitumens, tars, composite tars (June 1971)";

the tensile rheological characteristics, that is tensile strength threshold (bar), threshold elongation (%), tensile strength at rupture (bar) and elongation at rupture (%) according to French standard NF T 46 002.

By "threshold" is meant the changing point from the elastic to the viscous state.

The penetration value is according to French standard NF T 66 004.

The conventional bitumens do not generally meet all of the requirements specified and measured by these tests. Attempts have been made to add products or substances to the bituminous, particularly polymers in order to improve the mechanical properties of the bitumens. The added polymers or copolymers are in most cases thermoplastic elastomers having a molecular weight higher than 100,000. These elastomers do in fact improve the mechanical properties of the bitumens, but in most cases they give rise to solubility problems resulting in separation phenomenae when said bitumens are stored.

It is an object of the present invention to overcome these drawbacks; more particularly, it is an object of the present invention to provide a process of preparing stable polymer-bitumen mixtures which do not separate on standing. To achieve this object, it is necessary to modify the bitumen so as to adapt it to the polymer which then confers the required visco-elastic properties on said bitumen.

The method according to the present invention for preparing bitumen-based compositions comprises the steps of adding to a bitumen, having a penetration value varying between 30 and 220, an olefinic unsaturated organic compound constituted substantially of at least one hydrocarbon having a molecular weight varying between 300 and 30,000, and adding to the thus obtained product at least one polymer having a high molecular weight varying between 100,000 and 2,000,000.

During the first step of this method, an organic compound having a comparatively low molecular weight is added to the reactive sites of the bitumen, said organic compound improves the stability of the mixture of the modified bitumen with the high molecular weight polymer (thermoplastic elastomer).

Any known technique for adding the olefinically unsaturated organic compound to the bitumen may be used in the first step.

It is preferred, according to the present invention, to react or graft onto the bitumen an olefinic unsaturated organic compound having the following general formula:

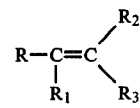

wherein $R_1$, $R_2$, $R_3$ are each either hydrogen or methyl, and at least one of the three groups being methyl, while R is a substantially hydrocarbon radical which may include cyclic groups and functional groups such as a carboxylic group, said radical being such that the molecular weight of the olefinically unsaturated compound is between 300 and 30,000.

According to an embodiment of the invention, the organic compound is added to the bitumen by bringing into contact said bitumen to be treated, the said olefinic organic compound and sulphur.

The bitumen and olefinically unsaturated compounds are mixed at a temperature varying between 140° and 230° C., and are maintained in contact with each other for a time sufficient to allow the olefinic organic compound to be added satisfactorily onto the bitumen, i.e. at least 10 hours.

At the end of this first step of the process of the present invention the product obtained, exhibits increased mechanical properties compared to those of the initial bitumen. The product of the first step can then be mixed with a polymer having a high molecular weight (thermoplastic elastomer) e.g. in an amount varying between 1 and 5% by weight to form a uniform mixture During the second step of the method of the present invention, a thermoplastic elastomer, having a molecular weight between 100,000 and 2,000,000, is added at an elevated temperature, i.e. between 140° and 230° C., to the product obtained by the first step described hereinabove, at a rate sufficient to provide a homogeneous mixture.

The following elastomers may be used in the method according to the present invention:

polyisobutenes;
styrene-butadiene rubber (SBR);
polychloroprenes (Neoprene);
isobutene-isoprene copolymers, halogenated or non-halogenated (butyl rubber);
ethylene-propylene-diene terpolymers (EPDM);
ethylene-propylene copolymers (EPR);
ethylene-cyclopentadiene copolymers;
polybutadienes;
polynorbornenes The various polymers are indicated by way of illustration, but not of limitation; of course they may be modified by grafting (with for instance acrylic acid, methacrylic acid or thioglycolic acid), or by bromination, by chlorination or by epoxidation.

The olefinic unsaturated organic compound used, in the first step of the method the present invention, in order to form the receiving structure for the elastomer, can be a polymer or a copolymer having a low molecular weight (oligomer), i.e. a molecular weight between 300 and 30,000. Among polymers which may by used, one may cite, by way of example, polymers having a structure similar to that of the above-listed elastomers, (i.e.: polyisobutene, polyethylene, polybutadiene, polyisoprene, polynorbornene, etc.).

It is also possible to use copolymers containing for example, $C_5$-petroleum cut resins, isoprene, piperylene and cyclopentadiene, or methylstyrene or vinyltoluene oligomers such as the $C_9$-petroleum cut resins.

The olefinically unsaturated organic compound may be high molecular weight non-polymeric compound wherein the R group of the above-indicated general formula can be a linear or cyclic structure which may include functional groups, especially a carboxylic group. The following type of compounds may be cited by way of example: the esters of heavy fatty acids (i.e. fatty acids containing 14 to 18 carbon atoms per molecule such as oleic acid, palmitic acid, stearic acid, etc.) and higher alcohols, (such as lanosterol, cholesterol, isocholesterol, etc.). Such compounds are found in lanoline.

The ethylenically unsaturated organic compounds useful in the practice of the present invention can be a mixture of homologous compounds; in this case the molecular weight to be taken into consideration is the average molecular weight of the mixture. This also applies to the elastomers which are used in the second step of the method of the present invention, only the average molecular weight has to be taken into consideration.

In order that the bitumen composition obtained according to the present invention possesses optimum mechanical properties, it is necessary to select the organic compound used in the first step of the method, as defined herein above, to be compatible with the elastomer to be introduced during the second step of said method. However, it is preferable that these substances have similar or even identical structures. For instance, if the elastomer is a substantially linear polymer such as polyethylene, polubutadiene, polyisobutene, etc., it is preferable to use, as an organic compound, an oligomer having a similar structure, for instance, polyisobutene. If the elastomer includes cyclic groups, it is preferable to use organic compounds which also contain cyclic groups.

The proportion of elastomer added to the bitumen depends on the visco-elastic properties which the final bitumen composition is expected to exhibit. This proportion is generally between 1 and 5% by weight.

The product of the first step of the process of the present invention should contain 5 to 30% by weight of an olefinic organic compound with respect to the amount of bitumen reacted or grafted onto the bitumen. In a preferred embodiment, the product of the first step of the process also contains from 0.2 to 4% by weight of sulphur with respect to the total amount of the two other components.

When carrying out the method according to the present invention, any natural or synthetic asphalts and bitumens, and previously air-or/steam-blown asphalts and bitumens can be used. Generally, the penetration value of the above-mentioned bitumens is between 30 and 220.

The olefinically unsaturated oganic compounds possess a molecular weight between 300 and 30,000, preferably between 400 and 2,000.

When sulphur is used during the first step of the instant method, it can be introduced in the form of sulphur flowers, sulphur powder, molten sulphur, and the like. In fact, during the first step, the sulphur acts as a "catalyst" with respect to the adding of the organic compound to the bitumen; the sulphur will not remain in the composition, and in fact will be released in the form of hydrogen sulphide. The addition probably occurs through a radical mechanism thus it is important that in this reaction the sulphur be added in an active form (i.e. not chemically bound).

The first step of the method according to the invention generally lasts between 10 and 20 hours. Preferably this step is carried out in the presence of an inert gas.

In one embodiment of the present invention, the two steps of the instant method may be carried out simultaneously by initially mixing the components of the mixture, that is to say, bitumen, oligomer, sulphur and elastomer, in appropriate proportions.

EXAMPLE 1

13.4 parts of a polyisobutene with an average molecular weight of 1015 and 3.7 parts of sulphur flower were added to 100 parts Safaniah 80–100 (A) bitumen having a penetration value of 80 to 100. The mixture was then heated under stirring during 13 hours at 166° C., while nitrogen was bubbled through said mixture.

The first step having been achieved, a bitumen (B) was obtained to which one part of an isobutene-butadiene copolymer with a molecular weight of 250,000 was added, and the resulting mixture was heated for an extra 4 hours at the same temperature.

A bitumen (C) was obtained at the end of this second step. The mechanical properties of these bitumens are indicated in the appended Table I.

EXAMPLE 2

13.4 parts of a "normal fat", the properties of which are indicated herein-below, and 3.7 parts of sulphur flowers were added to 100 parts of bitumen (A). The mixture was heated under stirring in an inert nitrogen atmosphere at 166° C. during 13 hours. At the end of this first step, two parts of an ethylenecyclopentadiene copolymer exhibiting the properties indicated herein-below were added to the obtained bitumen (D). Heating at 166° C. and stirring were carried out for four hours; a bitumen (E) was obtained. The mechanical properties of bitumens (D) and (E) are indicated in the appended Table I.

The "normal fat" is a mixture of fatty acid esters (esters of oleic acid, palmitic acid, stearic acid with higher alcohols such as lanosterol, cholesterol, isocholesterol) consisting of a natural extract of mutton suet. The normal fat possesses the following characteristics:

an average molecular weight of 680;
a moisture content lower than 1% (measured by drying in a drying oven at 105° C. during 4 hours);
an acidity index varying between 4 and 6°/$_{oo}$ (measur by the number of milligrams of KOH necessary to neutralize the free acidity of 1 gram of fat);
a saponification index of 90 to 100°/$_{oo}$;
an ash ratio of 0.2 to 0.4°/$_{oo}$;
a chlolesterol ratio of 10 to 13% (measured by chromatographic determination of the sterols contained in the non-saponifiable matter). The ethylene-cyclopentadiene copolymer has the following properties:
molecular weight: 2,000,000;
a second degree vitrous transition temperature of +35° C.;
an ash ratio lower than 0.2%;
a volatile substance content lower than 0.5%.

EXAMPLE 3

TABLE I

| Properties | Bitumens A | B | C | D | E | F |
|---|---|---|---|---|---|---|
| Softening point °C. | 48 | 57 | 74 | 51.5 | 61 | 59 |
| Breaking point °C. | −18 | −28 | −28 | −28.5 | −23.5 | −34.5 |
| Penetration at 25° C. 1/10 mn | 88 | 42 | 38 | | | |
| Adhesiveness % | 50 | 25 | 100 | 75 | 75 | 25 |
| Breaking extension % | | 250 | 230 | 700 | 630 | 220 |
| Tensile strength threshold at 20° C. (500 mm/mn) bars | 0.6 | 2 | 28 | 1.42 | 2.03 | 1.76 |

TABLE II

| Properties | Bitumens F | G | H | I | J |
|---|---|---|---|---|---|
| Softening point °C. | 57 | 70 | 73 | 80 | 75 |
| Breaking point °C. | −28 | −35 | −24 | −19 | −29 |
| Adhesiveness % | 25 | 80 | 90 | 75 | 100 |
| Tensile strength threshold at 20° C. 500 mm/mn (bars) | 2 | 2.2 | 6.6 | 4.4 | 2.8 |
| Breaking tensile strength at 20° C., 500 mm/mn-bars- | 0 | 0.3 | 0.93 | 1.29 | 0.2 |
| Breaking extension 20° C., 500 mm/mn (%) | 250 | 320 | 80 | 140 | 230 |

Two parts of the ethylene-cyclopentadiene copolymer of Example 2 were added to 100 parts of the bitumen (B) obtained in Example 1. The mixture was heated under stirring at 166° C. for four hours, and a bitumen (F) was obtained (cf. Table I).

When studying the results listed in Table I, it will be seen that the bitumen compositions, according to the invention, (Bitumens C and E) clearly exhibit improved properties as compared to those of the initial bitumen and to those of the intermediate compounds (B and D). The properties of bitumen F, while being of excellent quality, are however less satisfactory than those of bitumen E. It is thus proven preferable to use compounds having similar structures, when carrying out the two steps of the present method.

EXAMPLES 4 to 7

In these examples, the first step was performed in accordance with Example 1, and various polymers with high molecular weight were added to the thus obtained bitumen B, said polymers were added in accordance with the procedure described in Example 1.

Bitumen G was obtained by adding to Bitumen B, 1% of a styrene-butadiene-styrene copolymer, with a molecular weight of 150,000, 0.5% dodecanedioic acid and 5% of a heavy Safanyah distillate.

Bitumen H was obtained by adding 3% of a mixture of polybutene-polyisobutene polymers, with an average molecular weight of 282,000, to Bitumen B.

Bitumen I was obtained by adding to bitumen B: 3% of a mixture of a brominated butyl rubber (1.2%) and EPDM terpolymer (1.8%), the average molecular weight of said mixture being 500,000.

Bitumen J was prepared in the same manner as bitumen I but it also contained 0.5% dodecanedioic acid.

The mechanical properties of these various bitumens are listed in the appended Table II.

The invention is not limited to the Examples and embodiments described herein-before; numerous modifications and variants may be envisaged within the scope of the invention as defined by the appended claims.

What is claimed is:

1. A method for preparing novel bitumen compositions which comprises:
   (a) adding to a bitumen having a penetration value between 30 and 220, an olefinically unsaturated compound having a molecular weight between 300 and 30,000, at a temperature from 140° to 230° C. for at least 10 hours;
   (b) intermixing at a temperature from 140° to 230° C., a thermoplastic elastomer having a molecular weight between 100,000 and 2,000,000 with the product of step (a) whereby a bitumen having improved properties is formed.

2. The method of claim 1 wherein said olefinically unsaturated compound is represented by the formula

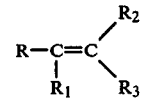

wherein $R_1$, $R_2$ and $R_3$ are each hydrogen or methyl and at least one of said groups is methyl, R is a substantially hydrocarbon radical which may contain cyclic or functional groups, said R being such that the molecular weight of the composition is between 300 and 30,000.

3. The method of claim 1 wherein said step (a) is carried out in the presence of sulfur.

4. The method of claim 1 wherein said olefinically unsaturated compound is an olefinic polymer having a molecular weight between 400 and 2,000.

5. The method of claim 3 wherein said olefinically unsaturated compound is a mixture of fatty acid esters of higher alcohols.

6. The method of claim 9 wherein the thermoplastic elastomer is substantially linear.

7. The method of claim 1 wherein said thermoplastic elastomer contains cyclic moieties.

8. The method of claim 1 where said olefinically unsaturated compound is a linear olefinic polymer and said thermoplastic elastomer is a linear olefinic polymer.

9. The method of claim 1 wherein said olefinically unsaturated compound and said thermoplastic elastomer each contain cyclic moieties.

10. A bitumen composition product of the process of claim 1.

* * * * *

UNITED STATES PATENT OFFICE
CERTIFICATE OF CORRECTION

Patent No. 4,154,710      Dated May 15, 1979

Inventor(s)      Paul Maldonado, et al

It is certified that error appears in the above-identified patent and that said Letters Patent are hereby corrected as shown below:

Column 2, line 63: "the present" should be --of the present--.

Column 3, line 9: after "be" insert --a--.

Column 4, line 54: "measur" should be --measured--.

Signed and Sealed this

Eleventh Day of December 1979

[SEAL]

Attest:

SIDNEY A. DIAMOND

Attesting Officer      Commissioner of Patents and Trademarks